(12) United States Patent
Hirai et al.

(10) Patent No.: US 11,592,999 B2
(45) Date of Patent: Feb. 28, 2023

(54) INFORMATION PROCESSING SYSTEM AND INFORMATION PROCESSING METHOD

(71) Applicant: Hitachi, Ltd., Tokyo (JP)

(72) Inventors: Tatsuya Hirai, Tokyo (JP); Takahiro Yamamoto, Tokyo (JP); Hiroto Ebara, Tokyo (JP); Masakuni Agetsuma, Tokyo (JP); Yoshinori Ohira, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 17/192,706

(22) Filed: Mar. 4, 2021

(65) Prior Publication Data

US 2021/0405890 A1    Dec. 30, 2021

(30) Foreign Application Priority Data

Jun. 26, 2020   (JP) .............................. JP2020-110860

(51) Int. Cl.
*G06F 3/06*   (2006.01)
*G06F 9/455*  (2018.01)

(52) U.S. Cl.
CPC ............ *G06F 3/0622* (2013.01); *G06F 3/067* (2013.01); *G06F 3/0623* (2013.01); *G06F 3/0653* (2013.01); *G06F 3/0659* (2013.01); *G06F 9/45545* (2013.01); *G06F 9/45558* (2013.01); *G06F 2009/45583* (2013.01)

(58) Field of Classification Search
CPC .... G06F 3/0622; G06F 3/0623; G06F 3/0653; G06F 3/0659; G06F 3/067; G06F 9/45545; G06F 9/45558; G06F 2009/45583
See application file for complete search history.

(56) References Cited

U.S. PATENT DOCUMENTS

| 10,742,414 | B1 * | 8/2020 | Wieker | G06F 3/0623 |
| 10,944,561 | B1 * | 3/2021 | Cahill | H04L 9/3213 |
| 2017/0034165 | A1 * | 2/2017 | Bagal | G06F 13/102 |
| 2017/0228532 | A1 * | 8/2017 | Tomar | H04L 67/1097 |
| 2019/0207929 | A1 * | 7/2019 | Koorapati | G06F 3/0652 |
| 2019/0361726 | A1 | 11/2019 | Nakagawa et al. | |

FOREIGN PATENT DOCUMENTS

JP    2019-204343 A    11/2019

* cited by examiner

*Primary Examiner* — Prasith Thammavong
(74) *Attorney, Agent, or Firm* — Procopio, Cory, Hargreaves & Savitch LLP

(57) ABSTRACT

The storage part receives an I/O request including the ID of software, information regarding a storage area to and from which the software performs input and output, and a token. The storage part checks the I/O request against the software ID, the information regarding the storage area, and the token received from an I/O control part so as to determine whether access to the storage part is allowed. Upon determination that the access to the storage part is allowed, the storage part processes the I/O request.

8 Claims, 14 Drawing Sheets

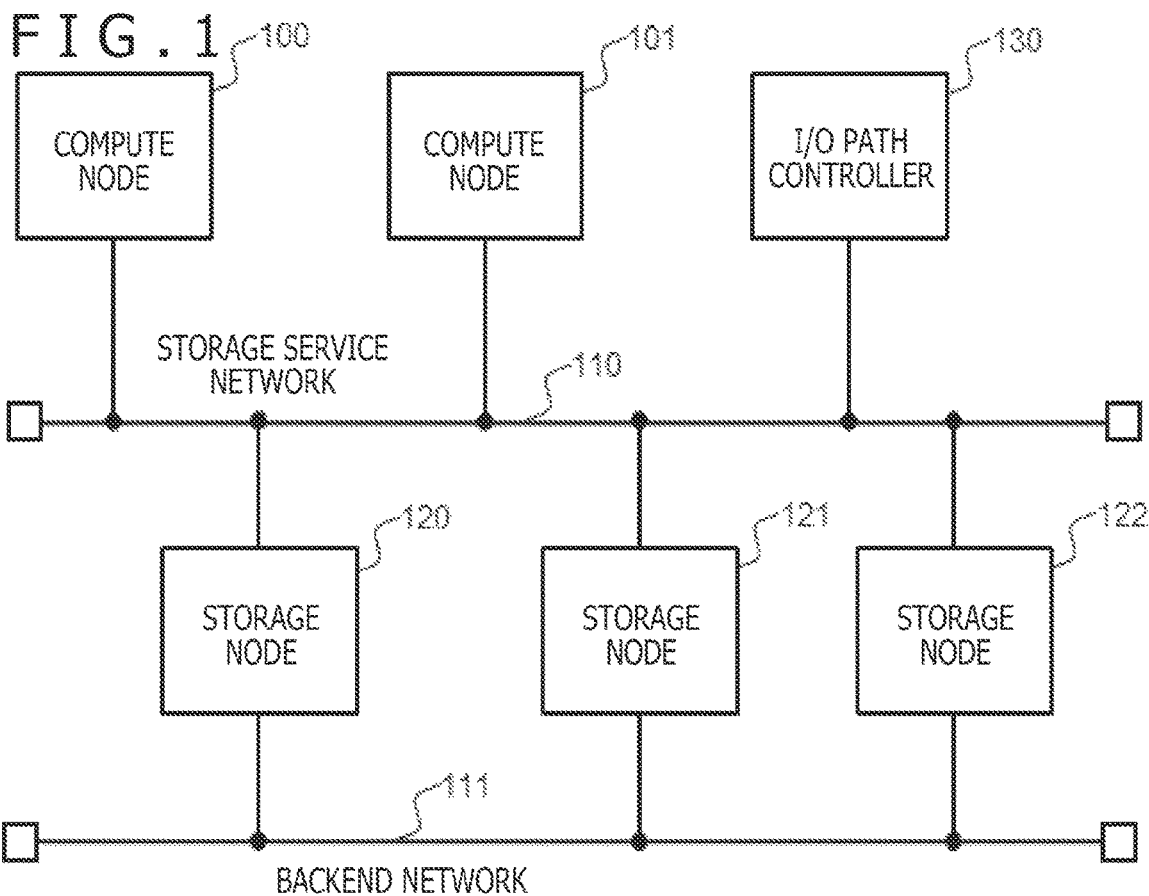
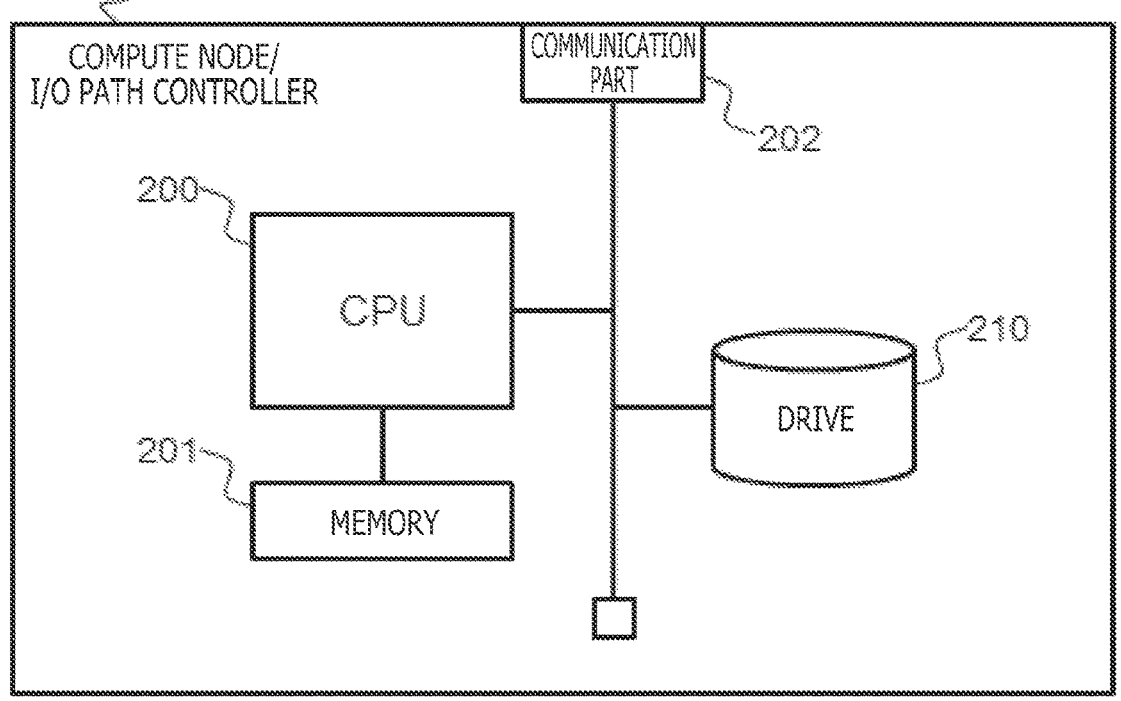

FIG.9

100 — TBL1

| Secret Cmp | HYPERVISOR ID (HVID) | GUEST OS ID (GOSID) | TARGET ID (TID) | VOLUME ID (VID) | TOKEN | HASH VALUE: H(GOSID\|\|TID\|\|VID\|\|TOKEN) |
|---|---|---|---|---|---|---|
| 900 | 901 | 902 | 903 | 904 | 905 | 906 |
| 779df5 0ee4... | dd98cc012... | 8a85f9813... | iqn.aaa... | 0 | 2ac75 29b... | 3bad1122... |
| | | | | 1 | 18ad3 625... | 0f3c2019... |
| | | | | 2 | 69a26 43d... | 62427ab... |
| | | | iqn.bbb... | 0 | b4d76 503... | 1b2bd439... |
| | | | | 1 | a85ab 0c7... | 2a558318... |

101 — TBL1

| Secret Cmp | HYPERVISOR ID (HVID) | GUEST OS ID (GOSID) | TARGET ID (TID) | VOLUME ID (VID) | TOKEN | HASH VALUE: H(GOSID\|\|TID\|\|VID\|\|TOKEN) |
|---|---|---|---|---|---|---|
| 26743 ad9... | 558a2ed3... | 2904ad1f... | iqn.ccc... | 0 | 66c28 829... | bd914257... |
| | | 9d4d0386... | iqn.ddd... | 0 | 83cfd 631... | 862c4461... |
| | | | | 1 | 4792b 91b... | 71d35528... |

FIG.10

| Secret Cmp | HYPERVISOR ID (HVID) | GUEST OS ID (GOSID) | TARGET ID (TID) | VOLUME ID (VID) | TOKEN |
|---|---|---|---|---|---|
| 779df5 0ee4... | dd98cc012... | 8a85f9813... | iqn.aaa... | 0 | 2ac75 29b... |
| | | | | 1 | 18ad3 625... |
| | | | | 2 | 69a26 43d... |
| | | | iqn.bbb... | 0 | b4d76 503... |
| | | | | 1 | a85ab 0c7... |
| 26743 ad9... | 558a2ed3... | 2904ad1f... | iqn.ccc... | 0 | 66c28 829... |
| | | 9d4d0386... | iqn.ddd... | 0 | 83cfd 631... |
| | | | | 1 | 4792b 91b... |
| | | | | | |
| | | | | | |
| | | | | | |

FIG.12

Table 120 (TBL4):

| Secret Str | TARGET ID (TID) | VOLUME ID (VID) | GUEST OS ID (GOSID) | TOKEN | HASH VALUE: H(GOSID\|\|TID\|\|VID\|\|TOKEN) |
|---|---|---|---|---|---|
| 94af23 de... | iqn.aaa... | 0 | 8a85f981 3... | 2ac75 29... | 3bad1122... |
| | | 1 | 8a85f981 3... | 18ad3 625... | 0f3c2019... |
| | | 2 | 8a85f981 3... | 69a26 43d... | 62427ab... |
| | iqn.ccc... | 0 | 8a85f981 3... | 66c28 829... | bd914257... |

Table 121 (TBL4):

| Secret Str | TARGET ID (TID) | VOLUME ID (VID) | GUEST OS ID (GOSID) | TOKEN | HASH VALUE: H(GOSID\|\|TID\|\|VID\|\|TOKEN) |
|---|---|---|---|---|---|
| 5298a 0f8... | iqn.bbb... | 0 | 8a85f981 3... | b4d76 503... | 1b2bd439... |
| | | 1 | 8a85f981 3... | a85ab 0c7... | 2a558318... |

INFORMATION PROCESSING SYSTEM AND INFORMATION PROCESSING METHOD

BACKGROUND OF THE INVENTION

1. Field of the Invention

The present invention relates to an information processing system and an information processing method.

2. Description of the Related Art

Heretofore, the information networks set up in diverse corporations (compute node and storage systems) have mostly been configured as part of an in-house network. There have been only limited cases where devices connected with external networks (e.g., the Internet) gain access to the storage system connected to the intra-firm network. Meanwhile, recent years have seen widespread acceptance of cloud storage services built on the Internet.

As a result, a growing number of companies are configuring their information processing systems not only as an on-premise type but also as a hybrid type or as a multi-cloud type. The hybrid type information processing system is one in which applications are obtained from software-as-a-service (SaaS) offerings and storage is provided by connection to the intra-firm network as well as by a cloud service. The multi-cloud type information processing system involves making use of multiple cloud services in a comprehensive manner.

Further, there have been increasing cases where the intra-firm storage resources are accessed from an Internet environment. In such cases, setting up a gateway or a firewall between the in-house network and the external network, which many companies have adopted, is not sufficiently effective in preventing malware from infiltrating into the internal network or malevolent entities on an external network from gaining unauthorized access to the information system connected to the in-house network.

Under these circumstances, it has been considered more appropriate to verify and authenticate the compute nodes or storage nodes communicably connected to the intra-firm network more rigorously than at present, as exemplified by what is known as the zero-trust model.

JP-2019-204343-A discloses a method for use in a case where multiple users sharing resources constituting a storage environment handle these resources (i.e., shared resources) in a manner setting a role for each of the shared resources so as to control access to a resource group to which the shared resources belong.

According to the method disclosed by the above-cited publication, however, each of the resources is to verify an input/output (I/O) request. This makes it difficult to manage the information required for the verification.

An object of the present invention is to provide an easy-to-manage configuration that verifies I/O requests from compute nodes so as to effectively prevent falsification and leaks of data.

SUMMARY OF THE INVENTION

According to one aspect of the present invention, there is provided an information processing system including multiple storage parts configured to input and output data upon receipt of an I/O request from a compute part on which software operates, and an I/O control part configured to control access to the storage parts from the compute part. The I/O control part receives from the compute part an authentication request including ID of the software and information regarding a storage area to and from which the software performs input and output. Upon authentication of the compute part, the I/O control part transmits a token to the compute part to let the compute part access the storage parts, the I/O control part further transmitting the ID of the software, the information regarding the storage region to and from which the software performs input and output, and the token to the storage part corresponding to the information regarding the storage area. The corresponding storage part receives from the compute part the I/O request including the software ID, the information regarding the storage area to and from which the software performs input and output, and the token, the corresponding storage part further checking the I/O request against the software ID, the information regarding the storage area, and the token received from the I/O control part so as to determine whether access to the corresponding storage part is allowed. Upon determination that the access to the corresponding storage part is allowed, the corresponding storage part processes the I/O request.

Thus according to one aspect of the present invention, falsification and leaks of data are effectively prevented with easy information management.

BRIEF DESCRIPTION OF THE DRAWINGS

FIG. 1 is a block diagram depicting an overall configuration of an information processing system as an embodiment of the present invention;

FIG. 2 is a block diagram depicting a schematic configuration of a compute node and an I/O path controller;

FIG. 9 is a view depicting a typical configuration of an access control information table for the compute node in the embodiment of the present invention;

FIG. 10 is a view depicting a typical configuration of a compute-node-oriented access control information table for the I/O path controller in the embodiment of the present invention;

FIG. 12 is a view depicting a typical configuration of an access control information table for the storage node in the embodiment of the present invention;

DESCRIPTION OF THE PREFERRED EMBODIMENTS

Figure 3:
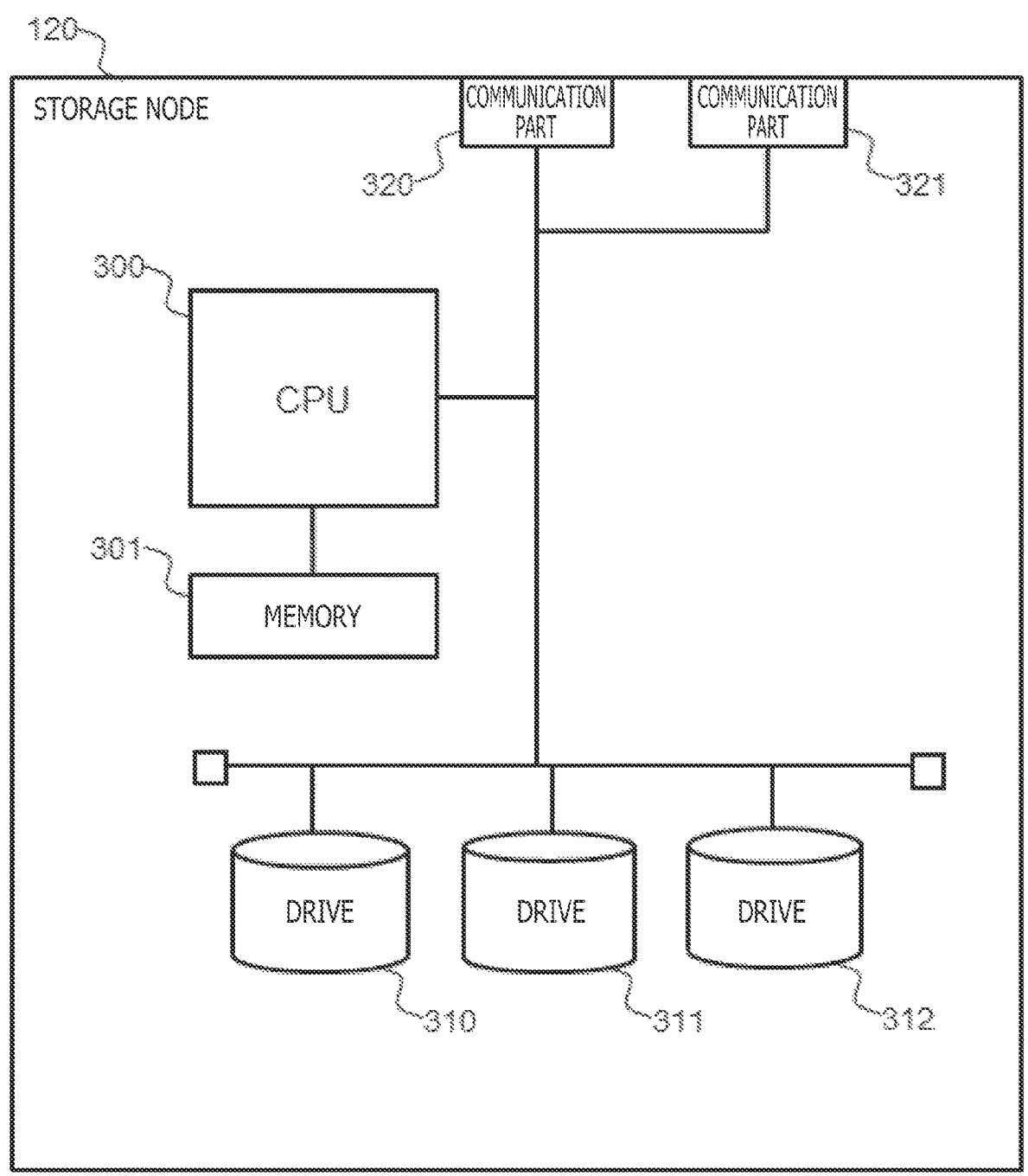
FIG. 3 is a block diagram depicting a schematic configuration of a storage node.

Some preferred embodiments of the present invention are described below in detail with reference to the accompanying drawings. The ensuring description and drawings are examples intended to explain the present invention and thus may be simplified or omitted as needed for purposes of clarification. Not all combinations of the features described in connection with the embodiments may be necessary as the means of the invention for solving problems. The embodiments of the present invention are not limitative thereof. All application examples conforming to the idea of the present invention fall within the technical scope thereof. Those skilled in the art will be able to add to or modify the present invention within the scope thereof. The present invention may be implemented in various other embodiments. Unless specifically noted, each of the constituent elements involved may be either singular or plural.

In the description that follows, such expressions as "tables," "charts" and "lists" may be used in explaining diverse information. Such diverse information may alternatively be expressed by use of data structures other than those described. In order to indicate that the information is not dependent on the data structure, an "XX table" or an "XX list" may be referred to as "XX information" where appropriate. Details of the information may be represented by such expressions as "identification information," "identifiers," "names," "IDs," and "numbers," which are interchangeable with one another.

Also in the ensuing description, in the case where elements of the same type are explained without being distinguished from each other, they may be represented by common reference characters or by a common number in reference characters. In the case where elements of the same type are explained as distinct from each other, each of the elements may be represented by its own reference characters or by an ID assigned to the element in place of the reference characters.

Also in the ensuing description, in the case where the processing performed by executing a program is explained, the agent of the processing may be considered a processor (e.g., central processing unit (CPU)) or processors that carry out the program using storage resources (e.g., memory) and/or an interface device (e.g., communication port) as needed. Likewise, the agent of the processing performed by executing programs may be considered a controller, an apparatus, a system, a computer, a node, a storage system, a storage apparatus, a server, a management computer, a client, or a host, each incorporating the processor or processors. Furthermore, the agent (e.g., processor) of the processing performed by executing the program may include hardware circuits that handle part or all of the processing. For example, the agent of the processing performed by executing the program may include hardware circuits that carry out encryption and decryption, or compression and expansion. The processor operates as functional parts that implement predetermined functions by operating in accordance with programs. The apparatus and the system each including the processor are an apparatus and a system that include such functional parts each.

The program may be installed into an apparatus such as a computer from a program source. The program source, for example, may be a program distribution server or computer-readable storage media. In the case where the program source is the program distribution server, the latter may include a processor (e.g., CPU) and storage resources. The storage resources may further store a distribution program and the programs intended for distribution. By executing the distribution program, the processor in the program distribution server may distribute the programs targeted for distribution to other computers. Also in the ensuing description, two or more programs may be considered implemented as one program, and one program may be considered implemented as two or more programs.

FIG. 1 depicts a configuration of an information processing system as an embodiment of the present invention. This information processing system is configured with multiple compute nodes 100 and 101, multiple storage nodes 120, 121 and 122, and one I/O path controller 130. In the description that follows, the compute nodes will be represented by reference numeral 100 and the storage nodes by reference numeral 120 where they need not be distinguished from each other. Such representations still signify that the same applies to all compute nodes and to all storage nodes.

The compute nodes 100, storage nodes 120, and the I/O path controller 130 are interconnected by a storage service network 110 that is configured with Fibre Channel, Ethernet (registered trademark), InfiniBand, or a wireless local area network (LAN), for example. The storage nodes are interconnected by a backend network 111 configured with a LAN, Ethernet, InfiniBand, or a wireless LAN, for example. It is to be noted that the storage service network 110 and the backend network 111 may be configured with the same network and that each compute node 100 and each storage node 120 may be connected to a management network other than the storage service network 110 or the backend network 111.

The compute node 100 is a general-purpose computer apparatus that functions as a host (higher-level device) with respect to the storage node 120. Alternatively, the compute node 100 may be a virtual computer apparatus such as a virtual machine. In response to user operations or to requests from installed application programs, the compute node 100 writes and reads data to and from the storage node 120 via the storage service network 110.

As depicted in FIG. 2, the compute node 100 includes at least one CPU 200, at least one memory 201, at least one storage drive 201, and a network communication part (network interface controller (NIC)) 202. The network communication part 202 provides an interface that allows the compute node 100 to communicate with the storage node 120 or with the I/O path controller 130 via the storage service network 110. The storage drive 210 stores, for example, an operating system (OS) that operates on the own node, application software that runs on this OS, a hypervisor for operating a virtual environment, a guest OS that runs on the hypervisor, and diverse application software that runs on the guest OS. The above-described configuration also applies to the I/O path controller 130.

As depicted in FIG. 3, the storage node 120 includes at least one CPU 300, at least one memory 301, multiple storage drives 310, 311 and 312, and first and second, or multiple, network communication parts 320 and 321. The network communication parts 320 and 321 provide an interface that allows the storage node 120 to communicate with the compute node 100 or with other storage nodes via the storage service network 110 or backend network 111.

The storage node 120 is a server apparatus that provides a storage area to and from which the compute node 100 writes and reads data. As with the compute node 100, the storage node 120 may be configured with a virtual machine. Alternatively, the storage node 120 may be configured to be in the same physical node as the compute node 100.

The CPUs of the compute node 100, storage node 120, and I/O path controller 130 are processors that supervise the operation control of all nodes. The memory incorporated in each of these components is configured with a volatile or nonvolatile semiconductor memory, such as a static random access memory (SRAM) or a dynamic random access memory (DRAM). The memory is used to temporarily hold various programs and necessary data as a work memory for the CPU. At least one CPU executes the programs held in the memory to perform diverse processes, to be discussed later.

The storage drives 310, 311 and 312 are each configured with a large-capacity nonvolatile storage apparatus such as a hard disk drive (HDD), a solid state drive (SSD), or a storage class memory (SCM). These drives are interconnected by a nonvolatile memory express (NVM) interface, serial attached SCSI (SAS) interface, or serial ATA (SATA) interface, for example, to provide a storage area to and from which data is written and read in response to read and write requests from the compute node 100.

Figure 4:
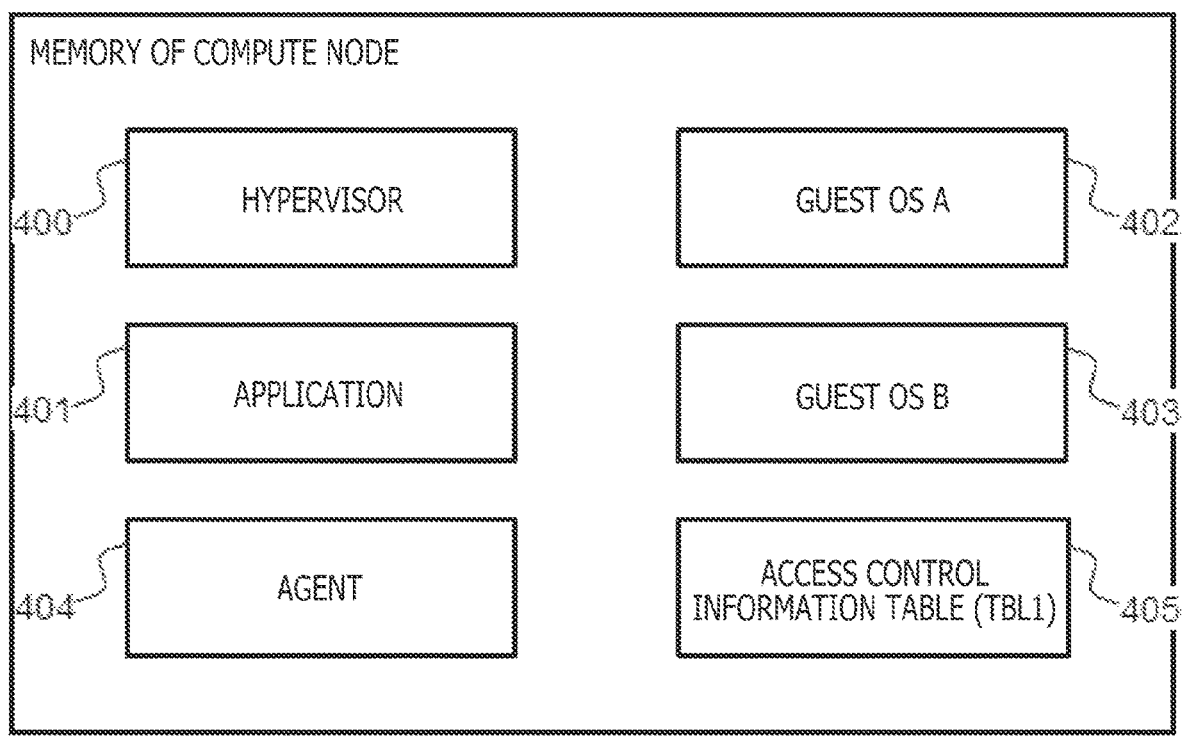
FIG. 4 is a block diagram explaining programs and information stored in the memory of the compute node.
Figure 5:
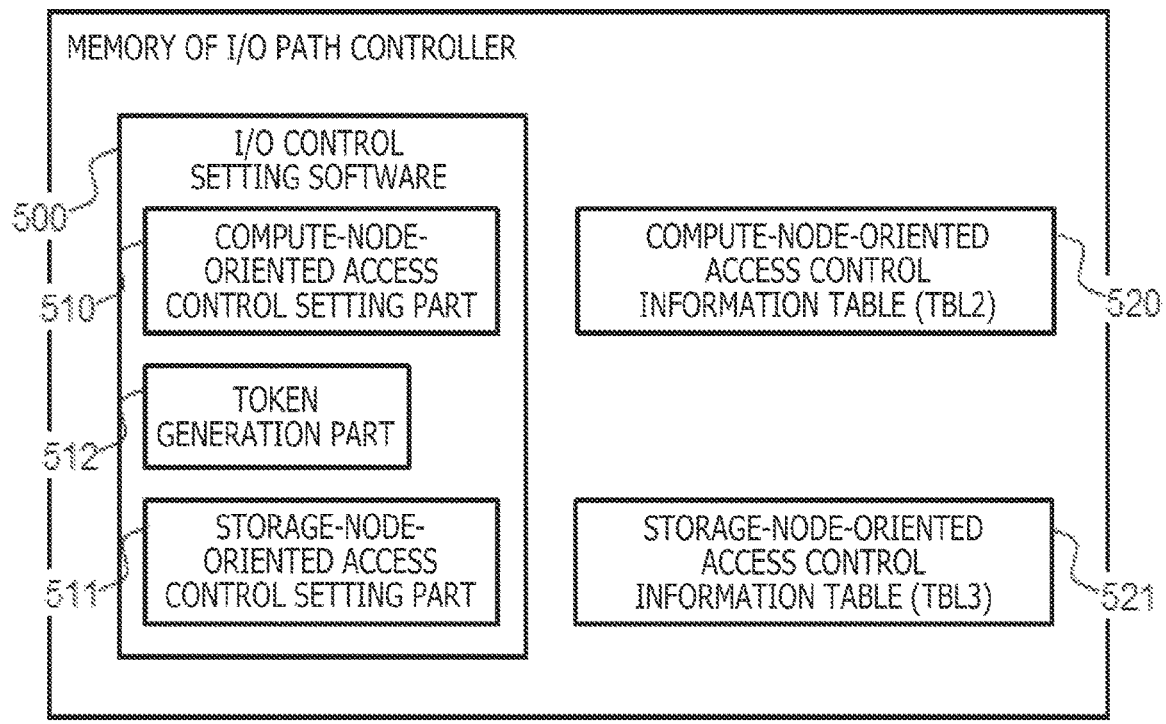
FIG. 5 is a block diagram explaining programs and information stored in the memory of the I/O path controller.
Figure 6:
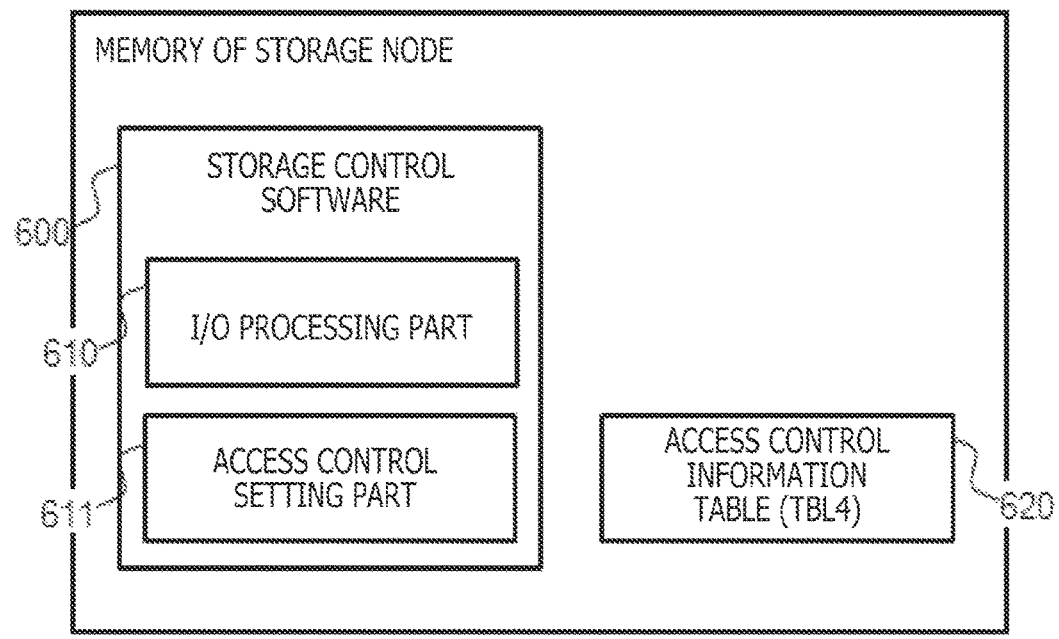
FIG. 6 is a block diagram explaining programs and information stored in the memory of the storage node.

Explained below with reference to FIGS. 4 to 6 are programs and information used for the processing of interest, the programs and the information being stored in the memories of the compute node 100, storage node 120, and I/O path controller 130 for use by these components.

FIG. 4 depicts information stored in the memory 201 of the compute node 100. The memory 201 stores: basic software for operating a virtual environment on the node (hypervisor 400 combined with guest OSs 402 and 403 in the drawing); application software 401 operating on the basic software; an agent 404 either performing processes with the I/O path controller 130 or sending and receiving thereto and therefrom the information related to I/O executability control according to this invention; and an access control information table 405 that stores the information exchanged or used during these processes. In the ensuing description, the access control information table 405 may be abbreviated as the TBL1.

Although the basic software in this example is configured with the hypervisor and guest OSs as explained above, this is not limitative of the present invention. Alternatively, there may be provided a host configuration (in which the hypervisor is run on a host OS) or a configuration where a container platform is run on the OS operated on a bare-metal machine. Whereas one application 401 and two guest OSs 402 and 403 are held in the memory in this example, they are not limitative of the number of applications or that of guest OSs.

FIG. 5 depicts information stored in the memory 201 of the I/O path controller 130. The memory 201 stores I/O control setting software 500, a compute-node-oriented access control information table 520, and a storage-node-oriented access control information table 521. The I/O control setting software 500 includes a compute-node-oriented access control setting part 510, a storage-node-oriented access control setting part 511, and a token generation part 512. The compute-node-oriented access control setting part 510 is an element having the function of transmitting to the agent 404 operating on the compute node 100 the information that needs to be managed by the compute node 100 to authenticate guest OSs and applications on the compute node 100 so as to let the storage node 120 control I/O executability.

Likewise, the storage-node-oriented access control setting part 511 is an element having the function of transmitting to the storage node 120 the information by which the storage node 120 determines whether to execute an I/O request issued to the storage node 120. The token generation part 512 is an element that generates a token and sends it to the compute-node-oriented access control setting part 510 and to the storage-node-oriented access control setting part 511. The information for compute mode authentication and the information to be set for the compute node 100 and for the storage node 120 are arranged in the compute-node-oriented access control information table 520 and in the storage-node-oriented access control information table 521. In the ensuing description, the compute-node-oriented access control information table 520 and the storage-node-oriented access control information table 521 will be abbreviated as the TBL2 and the TBL3, respectively.

FIG. 6 depicts information stored in the memory 301 of the storage node 120. The memory 301 stores storage control software 600 and an access control information table 620. In the ensuing description, the access control information table 620 will be abbreviated as the TBL4. The storage control software 600 includes an I/O processing part 610 and an access control setting part 611. The access control setting part 611 is an element having the function of performing an authentication process with the I/O control setting software 500 (storage-node-oriented access control setting part 511) in the I/O path controller 130, receiving the token sent from the I/O path controller 130, and registering the token to the access control information table 620.

The I/O processing part 610 is an element having the function of determining the executability of an I/O request from the compute node 100 based on the information held in the access control information table 620, and executing I/O processing in accordance with the result of the determination. The information by which the storage control software 600 (I/O processing part 610) determines the executability of the I/O request is stored in the access control information table 620.

Incidentally, so-and-so software mentioned in the foregoing description may also be referred to as a so-and-so program.

Explained next with reference to FIGS. 9 to 12 is the information (items) registered to the TBL1 405 of the compute node 100, to the TBL2 520 and TBL3 521 of the I/O path controller 130, and to the TBL4 620 of the storage node 120. The explanation will proceed with reference to FIG. 9, FIG. 10, FIG. 12, and FIG. 11, in that order.

FIG. 9 depicts the elements of the TBL1. The TBL1 has, as its elements, secret information SecretCmp 900, one piece of which is assigned to each compute node; information identifying the hypervisor operating on each compute node (hypervisor ID (HVID) 901); information identifying a guest OS built on this hypervisor (guest OS ID (GOSID) 902); information identifying a storage space in which the guest OS performs I/O operations (target ID (TID) 903 and volume ID (VID) 904); tokens 905 each assigned to each group of GOSID, TID and VID; and hash values 906 each combining GOSID, TID, VID, and the token. The upper part of FIG. 9 depicts the TBL1 of the compute node 100, the TBL1 indicating that the compute node 100 is assigned SecretCmp=779df50ee . . . , that a hypervisor of which HVID=dd98cc012 . . . is built on this compute node; that a guest OS of which GOSID=8a85f9813 . . . is built on this hypervisor; and that this guest OS may perform I/O operations in storage spaces of which TID=iqn.aaa . . . and VID=0, 1, 2 and of which TID=iqn.bbb . . . and VID=0, 1. The lower part of FIG. 9 depicts the TBL1 of another compute node 101.

FIG. 10 depicts the elements of the TBL2. The TBL2 is the same as the TBL1 except for hash values 906. That is, in the TBL2, an element 1000 is the same as the element 900; an element 1001 is the same as the element 901; an element 1002 is the same as the element 902; an element 1003 is the same as the element 903; an element 1004 is the same as the element 904; and an element 1005 is the same as the element 905. As depicted in FIG. 10, the TBL2 includes the TBL1 of all compute nodes.

FIG. 12 depicts the elements of the TBL4. The TBL4 has, as its elements, secret information SecretStr 1200, one piece of which is assigned to each storage node; information identifying a storage space configured for each storage node (target ID (TID) 1201 and volume ID (VID) 1203); tokens 1204 each assigned to each group of GOSID, TID and VID; and hash values 1205 each combining GOSID, TID, VID, and the token. The upper part of FIG. 12 depicts the TBL4 of the storage node 120, the TBL4 indicating that the storage node 120 is assigned SecretStr=94af23de . . . , that a target of which TID=iqn.aaa . . . is built on this storage node; and that storage spaces of which VID=0, 1, 2 are built under this target. The lower part of the FIG. 12 depicts the TBL4 of another storage node 121.

Figure 11:
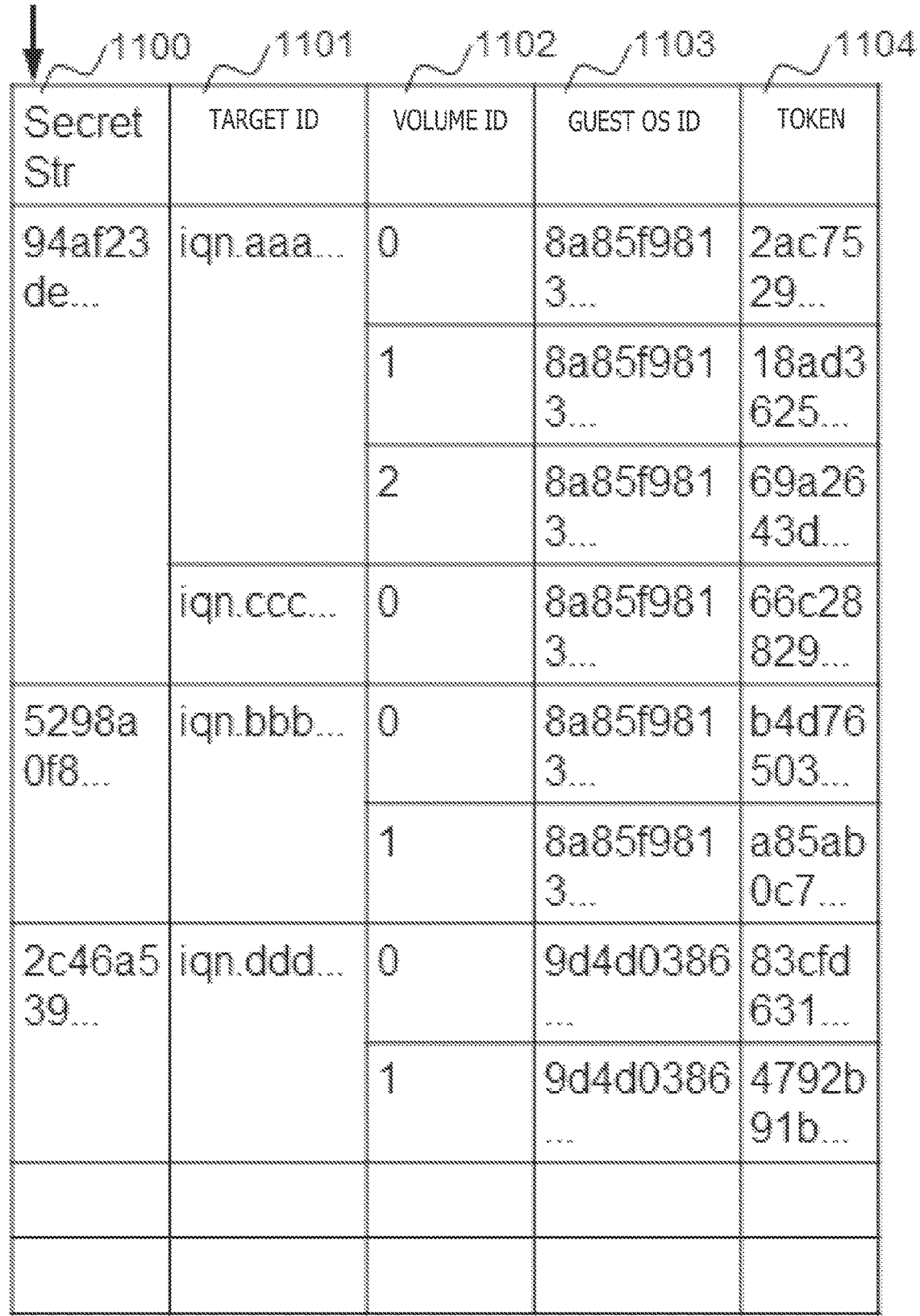
FIG. 11 is a view depicting a typical configuration of a storage-node-oriented access control information table for the I/O path controller in the embodiment of the present invention.

FIG. 11 depicts the elements of the TBL3. The elements of the TBL3 are the same as those of the TBL4 except for hash values 1205. That is, in the TBL3, an element 1100 is the same as the element 1200; an element 1101 is the same as the element 1201; an element 1102 is the same as the element 1202; an element 1103 is the same as the element 1203; and an element 1104 is the same as the element 1204. As depicted in FIG. 11, the TBL3 includes the TBL4 of all storage nodes.

Figure 7:
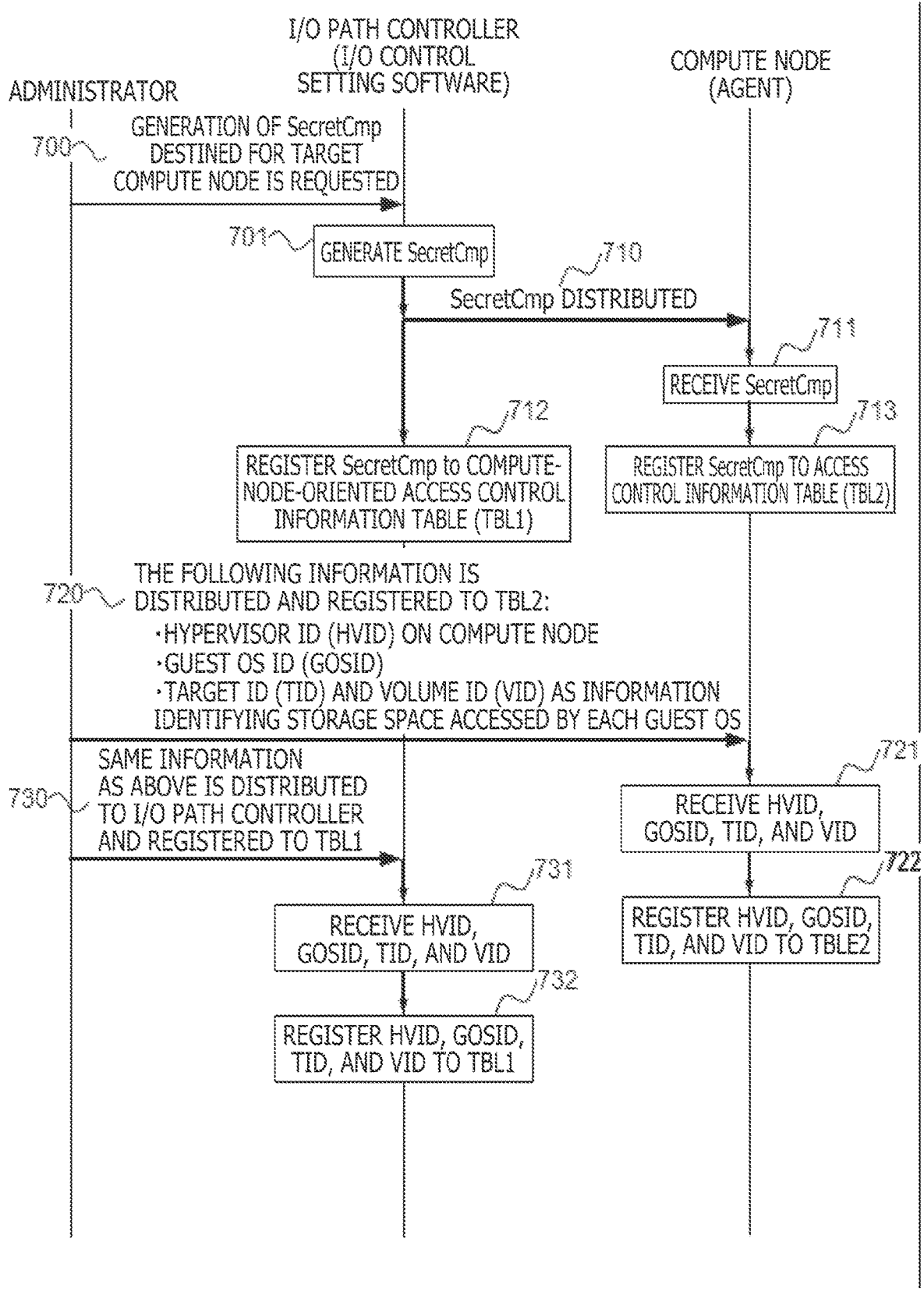
FIG. 7 is a ladder chart depicting a processing procedure for setting secret information to the I/O path controller and to the compute node.

Explained below with reference to FIG. 7 as well as to the above-described FIGS. 9 and 10 is the process of registering information to the TBL1 405 of the compute node and to the TBL2 520 of the I/O path controller, together with the information to be registered.

In the case where the compute node 100 is newly added to the system, the administrator requests the I/O path controller 130 to generate SecretCmp (step 700) along with the information identifying the target compute node 100 (e.g., IP address, universally unique identifier (UUID), or product serial number). After generating SecretCmp (step 701), the I/O path controller 130 (I/O control setting software 500) transmits the generated SecretCmp to the compute node 100 that matches the identification information given by the administrator (steps 710 and 711). The I/O path controller 130 and the compute node 100 register the SecretCmp to the TBL2 and to the TBL1, respectively (steps 712 and 1000, 713 and 900). This registration may alternatively be made manually by the administrator.

The administrator proceeds to register the hypervisor on the target compute node 100, the ID of the guest OS built on the hypervisor, and the information identifying the storage area accessed by each guest OS to the TBL1 405 of this compute node and to the TBL2 520 of the I/O path controller 130 (steps 720 to 721, registration items 901 to 904). For this embodiment, it is assumed that the storage area accessed by the guest OS is identified by a target ID and by the ID of the volume configured under the target. However, this method is not limitative of the means for identifying the storage area because such means is dependent on the configuration involved. Although the tokens 905 and the hash values 906 are included in the TBL1 as the registration items for each volume ID as depicted in FIG. 9, these items need not be registered at the time of the initialization above. Since a hash value is to be calculated from the guest OS ID, target ID, volume ID, and token, the hash value is calculated upon receipt of the token before being registered to the TBL1. The timing for calculating and registering the token and hash value will be discussed in conjunction with the explanation of FIG. 13.

The administrator then instructs the I/O control software 500 of the I/O path controller 130 to register, in the form of the TBL2 520, the same content (except for tokens and hash values) as that registered to the TBL1 405 of the target compute node 100 (steps 730 to 732, registration items 1001 to 1004). It is to be noted that the TBL2 520 does not have the hash value column. As is the case of the compute node 100, the tokens are registered at the time of their generation. As with the TBL1 405, the timing for the registration will be discussed in conjunction with the explanation of FIG. 13. Whereas FIG. 7 indicates that the administrator is to register the hypervisor ID, guest OS ID, and volume ID to the TBL1, the agent 404 on the compute node 100 and the I/O control setting software 500 of the I/O path controller 130 may alternatively communicate with each other to make the registration to the TBL1 405 and to the TBL2 520.

Figure 8:
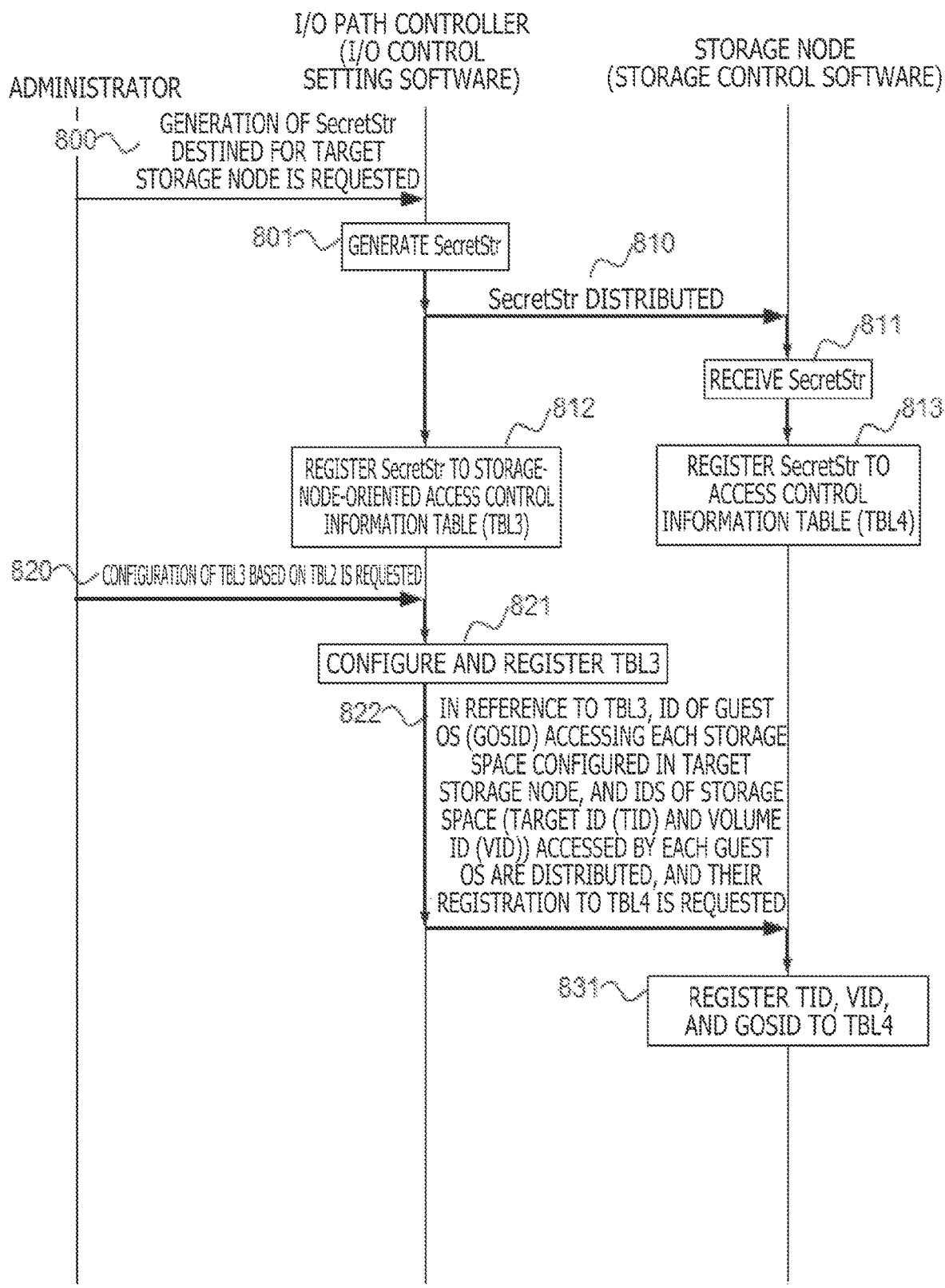
FIG. 8 is a ladder chart depicting a processing procedure for setting secret information to the I/O path controller and to the storage node.

Explained below with reference to FIG. 8 as well as to the above-described FIGS. 11 and 12 is the process of registering information to the TBL3 521 of the I/O path controller 130 and to the TBL4 620 of the storage node 120, along with the information to be registered. In the case where the storage node 120 is newly added to the system, the administrator requests the I/O control setting software 500 of the I/O path controller 130 to generate SecretStr (step 800) along with the information identifying the target storage node 120 (e.g., IP address, universally unique identifier (UUID), or product serial number).

After generating SecretStr (step 801), the I/O control setting software 500 transmits the generated SecretStr to a designated storage node 120 (steps 810 and 811). The I/O control setting software 500 and the storage control software 600 of this storage node register the generated SecretStr to the TBL3 521 and to the TBL4 620, respectively (steps 812 and 813). The registration to the TBL4 620 of the storage node may alternatively be made manually by the administrator.

The administrator proceeds to request the I/O control setting software 500 of the I/O path controller 130 to register to the TBL3 521 the information regarding the guest OS accessing each storage space (identified by target ID and volume ID) from the TBL2 520 (step 820). Upon receipt of the request, the I/O control setting software 500 configures from the information registered in the TBL2 520 the information to be registered to the TBL3 521, and registers the configured information to the TBL3 521 (step 821). Upon completion of the registration, the I/O control setting software 500 transmits to the applicable storage node 120 the information registered to the TBL3 521, thereby requesting the storage node 120 to register the information to the TBL4 620 (step 822). Upon receipt of the information and the request, the storage control software 600 of the storage node 120 registers the received information to the TBL4 620 (step 831).

Figure 13:
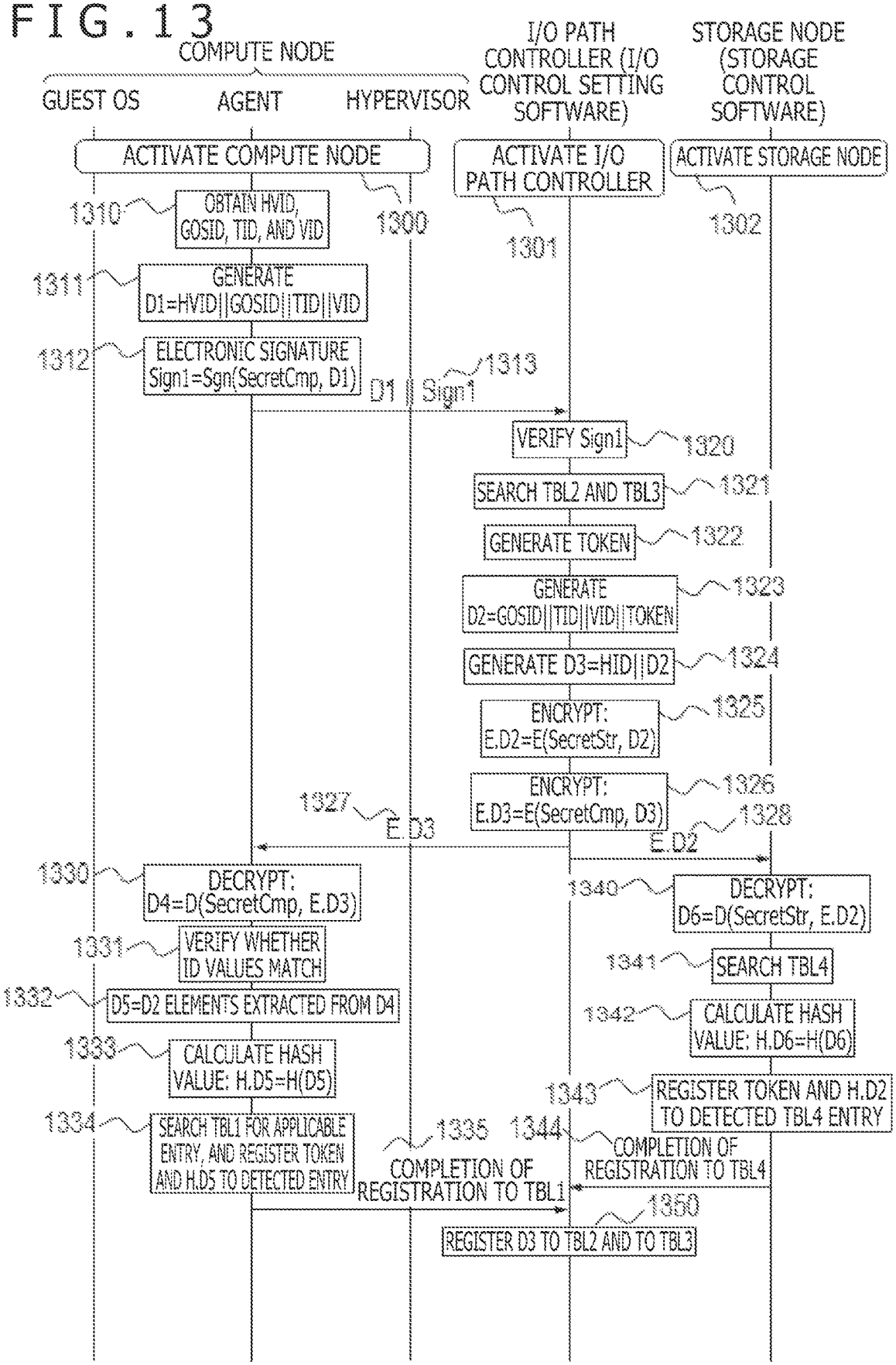
FIG. 13 is a ladder chart depicting a procedure for notification by, and setting of, tokens from the I/O path controller to the compute node and to the storage node in the embodiment of the present invention.

Explained next with reference to FIG. 13 is an access control process performed between the compute node 100, I/O path controller 130, and storage node 120 after the three components have been activated (steps 1300 to 1302) and before the compute node 100 performs an I/O operation on the storage node 120, along with the information transmitted and received therebetween. What follows is an explanation of what takes place in a state where the three components are already active.

The agent 404 of the compute node 100 acquires the ID of the guest OS (HVID and GOSID) built on this hypervisor and the ID of the storage space accessed by this guest OS (target ID (TID) and volume ID (VID)) via a compute node drive or by way of an application programming interface (API) of the software such as the guest OS and the hypervisor (step 1310).

In the case where multiple guest OSs are being built, steps 1311 to 1350 are performed for each guest OS. What is explained here are the steps carried out for one guest OS. Next, data D1 is generated by combining HVID, ID of the selected guest OS (GOSID), TID, and VID (step 1311). A symbol "||" in step 1311 in the chart signifies that the data items involved are combined. After generating the data D1, the agent 404 calculates an electronic signature Sign1 regarding the data D1 using SecretCmp registered in the TBL1 405 (step 1312).

For this embodiment, it is assumed that the same values of SecretCmp is registered between the compute node 100 and the I/O path controller 130 and that the same value of SecretStr is registered between the I/O path controller 130 and the storage node 120. Thus one way of calculating the electronic signature is by using SecretCmp as the key of symmetric key cryptography for the calculation in accordance with Galois Message Authentication Code (GMAC) algorithm. However, this calculation method is not limitative of the present invention. A symbol Sgn(x) in step 1312 in the chart represents the algorithm or the function for calculating the electronic signature of a value x. After calculating the electronic signature Sign1, the agent 404 combines Sign1 with the data D1 and transmits the combination to the I/O path controller 130 (step 1313).

Upon receipt of the data D1 and Sign1, the I/O control setting software 500 of the I/O path controller 130 calculates the value of the electronic signature, according to the algorithm of Sgn(x), using the data D1 and the value of SecretCmp registered in the TBL2 520 (step 1320). If the result of the calculation fails to match Sign1, the process is stopped. In the case where the calculation result matches Sign1, the I/O control setting software 500 searches the TBL2 520 for an entry in which the values of HVID, GOSID, TID, and VID received in step 1313 are set, and searches the TBL3 521 for an entry in which the values of the received TID, VID, and GOSID are set (step 1321).

The I/O control setting software 500 then generates a token (step 1322). The I/O control setting software 500 proceeds to generate data D2 by combining the token generated in step 1322 with GOSID, TID, and VID, and generate data D3 by combining HVID with the data D2 (steps 1323 and 1324). The I/O control setting software 500 then encrypts the data D2 and D3 using SecretStr and SecretCmp registered in the entries detected in step 1321 in the TBL3 521 and TBL2 520, respectively, to generate E.D2 and E.D3 (steps 1325 and 1326). Reference characters E.Dx in steps 1325 and 1326 in the chart indicate that data Dx is encrypted data, and reference characters E(X,Y) in the same steps indicate that data Y is encrypted by use of key data X. Any encryption algorithm may be adopted as long as it is sufficiently secure. Advanced Encryption Standard encryption (AES256-GCM96) is one such algorithm available at present.

After generating E.D2 and E.D3, the I/O control setting software 500 transmits E.D3 to the compute node 100 and E.D2 to the storage node 120 (steps 1327 and 1328).

When the compute node 100 receives E.D3, the agent 404 obtains data D4 by decrypting the received E.D3 using SecretCmp (step 1330). The agent 404 then verifies whether the obtained data D4 matches the values included in the data D1 generated by the agent 404 in step 1311 (step 1331). In case of a mismatch, the process is stopped. In the case where the values match with one another, the agent 404 extracts the elements of the data D2 (GOSID||TID||VID||token) from the data D4 to constitute data D5, and calculates a hash value H.D5 of the data D4 (steps 1332 and 1333).

Any hash algorithm may be used as long as it is recognized to be sufficiently secure. Secure Hash Algorithm (SHA-256) is one such algorithm. Reference characters H.Dx represent a hash value calculated from data Dx, according to a prescribed algorithm. After calculating the hash value H.D5, the agent 404 registers the token and H.D5 to the applicable entry in the TBL1 405 (step 1334). Upon completion of the registration, the agent 404 notifies the I/O path controller 130 thereof (step 1335).

In parallel with steps 1330 to 1334 performed by the compute node 100, steps 1340 to 1344 are carried out by the storage node 120. When the storage node 120 receives E.D2, the storage control software 600 obtains data D6 by decrypting E.D2 using SecretStr (step 1340). The storage control software 600 then extracts GOSID, TID, VID, and a token from the data D6, and searches the TBL4 620 for an entry that includes the applicable values (step 1341). After detecting the appropriate entry, the storage control software 600 calculates a hash value H.D6 of the data D6, and registers the token and the hash value H.D6 to the entry detected as described above in the TBL4 620 (steps 1342 and 1343). Upon completion of the registration, the storage control software 600 notifies the I/O path controller 130 thereof (step 1344).

Upon receipt of a notification 1335 from the compute node 100 and a notification 1344 from the storage node 120, the I/O control setting software 500 of the I/O path controller 130 registers the elements HVID, GOSID, TID, VID, and the token of the data D3 to the entries in the TBL2 520 and TBL3 521 detected in step 1321.

The above-described steps allow each compute node 100 to hold the token assigned to each guest OS built on this node and the token assigned to the storage space in which each guest OS performs I/O operations. Also, the above steps enable each storage node 120 to hold the same token as that registered in the compute node 100 with respect to the storage space configured in the storage node 120.

Figure 14:
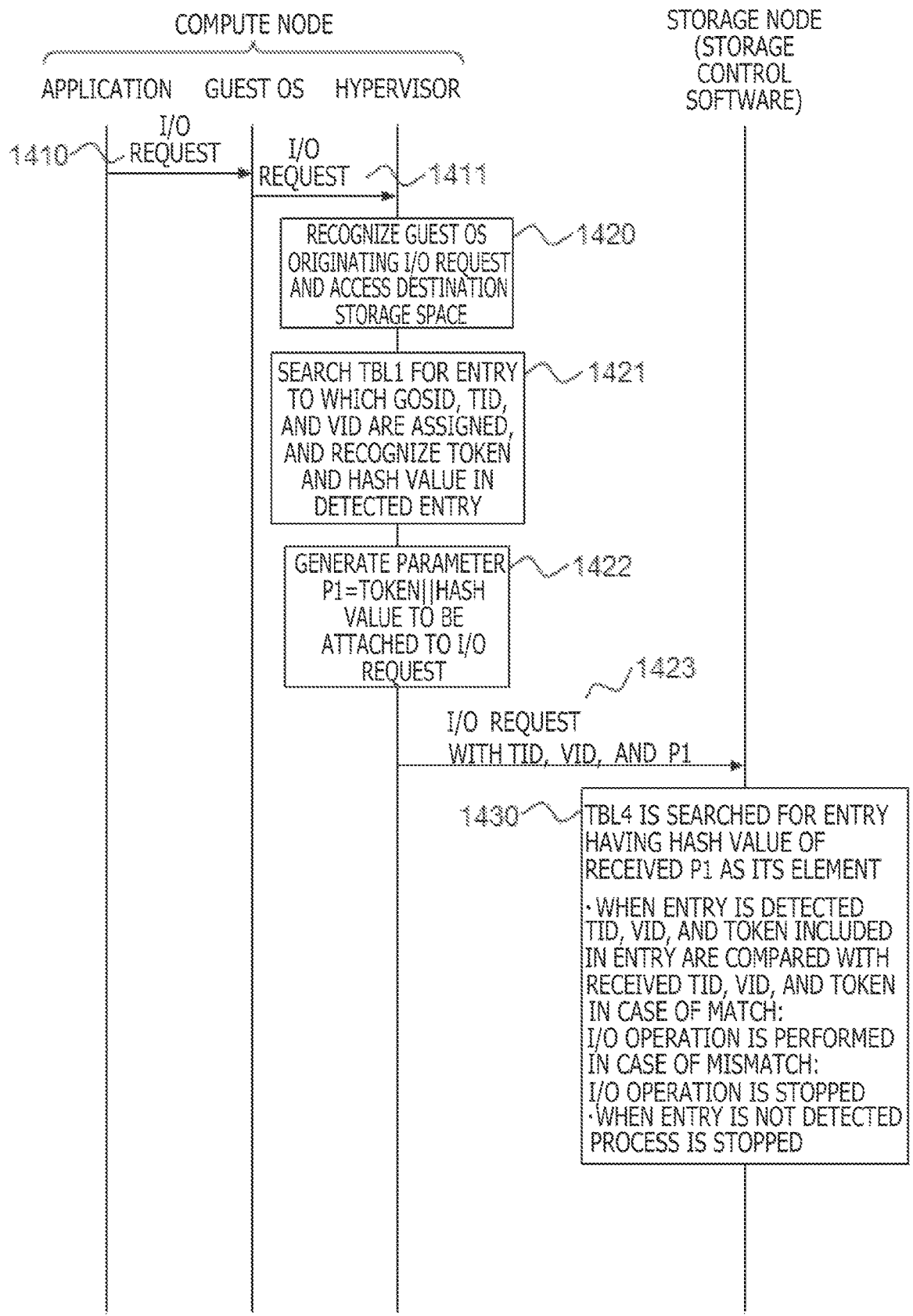
FIG. 14 is a ladder chart depicting a processing procedure for the storage node to determine whether to execute an I/O request from the compute node in the embodiment of the present invention.

Explained next with reference to FIG. 14 is the process performed by the storage node 120 to determine the executability of an I/O request issued thereto by an application 401 operating on a guest OS of the compute node 100.

When the application 401 issues an I/O request to the guest OS, the guest OS notifies the hypervisor 400 of the request (steps 1410 and 1411). Upon receipt of the request information, the hypervisor 400 recognizes the guest OS originating the I/O request and the ID of the I/O-destined storage space (GOSID, TID, VID) (step 1420). The hypervisor 400 then searches the TBL1 for an entry to which the recognized GOSID, TID, and VID are assigned, and recognizes the token and hash value included in the entry (step 1421). The hypervisor 400 generates a parameter P1 by combining the token and hash value extracted from the TBL1 405 (step 1422), and transmits the parameter P1 together with the I/O request to the storage node 120 (step 1423).

Upon receipt of the I/O request and the parameter P1, the storage node 120 searches the TBL4 620 for an entry that has the hash value in the parameter P1 as an element. Upon detecting the applicable entry, the storage node 120 compares the TID, VID and token included in the entry with the received TID and VID and the token in the parameter P1. In the case where all values match with one another as a result of the comparison, the storage node 120 performs the requested I/O operation. On the other hand, if any one of the elements fails to match or if the applicable entry is not detected, the process is stopped (step 1430).

The above-described steps allow the storage node 120 to deny executing the I/O request from the guest OS not authorized to perform I/O operations in the storage space configured in the storage node 120.

Figure 15:
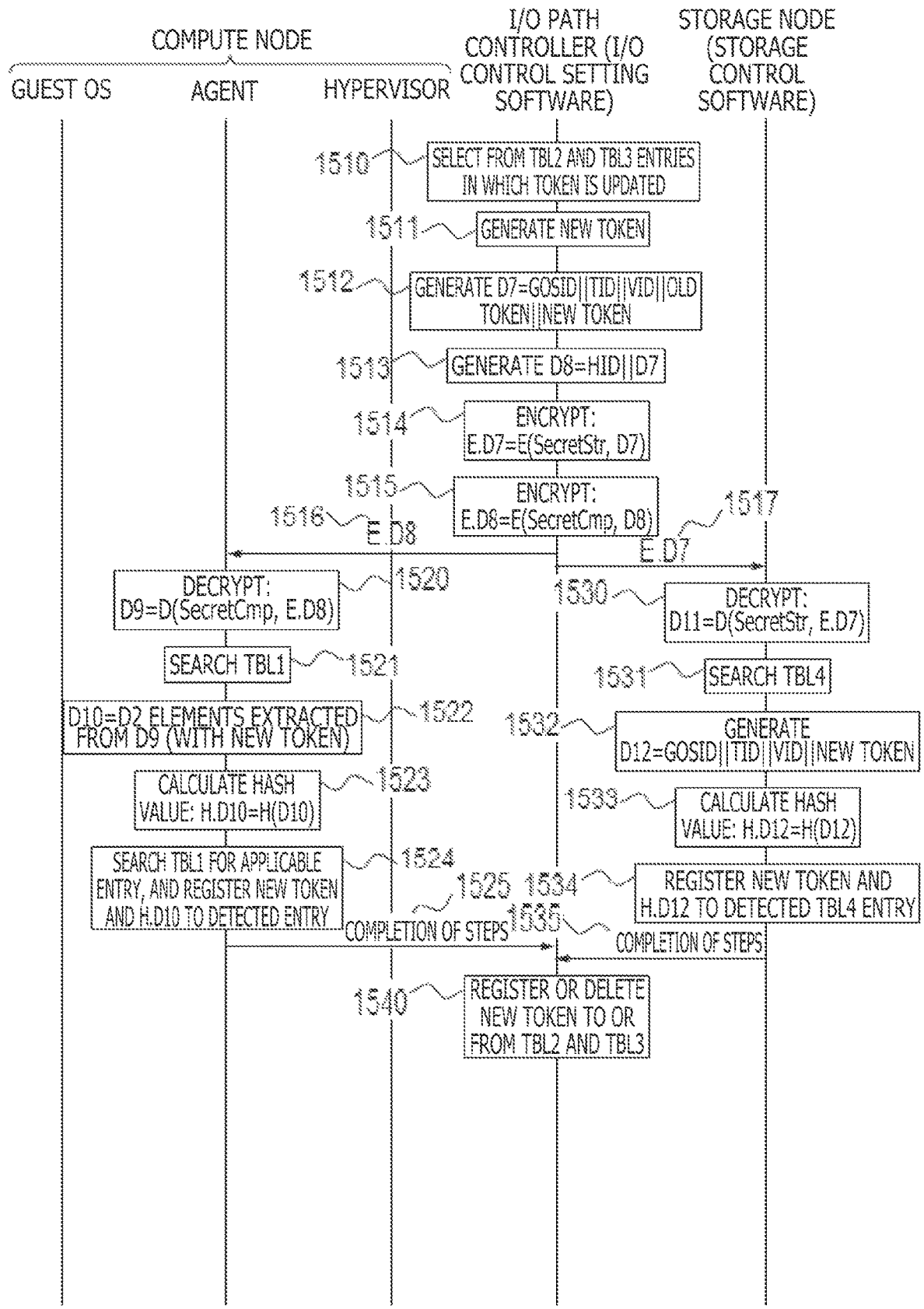
FIG. 15 is a ladder chart depicting a processing procedure for update and deletion of tokens in the embodiment of the present invention.

Explained next with reference to FIG. 15 is the process of updating or deleting a registered token. The typical cases of updating or deleting the token include one in which the administrator makes the request to do so and one in which, upon expiration of the validated period set on a token, the token is automatically updated or deleted. FIG. 15 depicts a flow of steps constituting the process in one of such cases starting from the point in time at which the token to be updated is selected by the I/O path controller 130.

After selecting the token to be updated, the I/O control setting software 500 of the I/O path controller 130 generates a new token (step 1511). In the case where the selected token is to be deleted, nothing is generated at this point. The I/O control setting software 500 then generates data D7 by combining the new token generated in step 1511 with GOSID, TID, VID, and the previously used token (old token), and generates data D8 by combining the data D7 with HVID (steps 1512 and 1513). In the case of the deletion, nothing is placed in the new token part. The I/O control setting software 500 proceeds to generate E.D7 by encrypting the data D7 using SecretStr registered in the entry selected from the TBL3 521 in step 1510 and generate E.D8 by encrypting the data D8 using SecretCmp registered in the entry selected from the TBL2 520 in the same step (steps 1514 and 1515).

After generating E.D7 and E.D8, the I/O control setting software 500 transmits E.D8 to the compute node 100 and E.D7 to the storage node 120 (steps 1516 and 1517).

When the compute node 100 receives E.D8, the agent 404 obtains data D9 by decrypting E.D8 using SecretCmp (step 1520). The agent 404 then searches the TBL1 405 for an entry that includes HVID, GOSID, TID, VID, and the old token included in the data D9 (step 1521). In the case where the applicable entry is not detected, the process is stopped. Where the applicable entry is detected and where the token is to be updated, the agent 404 obtains data D10 by extracting a portion corresponding to the data D2 (GOSID∥TID-∥VID∥new token) from the data D9, and calculates a hash value H.D10 of the data D10 (steps 1522 and 1523).

After calculating H.D10, the agent 404 overwrites the applicable entry in the TBL1 405 with the new token and H.D10 for registration (step 1524). In the case of the deletion, the agent 404 deletes the registered old token from the applicable entry. The agent 404 may alternatively delete GOSID, TID, VID, and the token. Upon completion of the above steps, the agent 404 notifies the I/O path controller 130 thereof (step 1525).

In parallel with steps 1520 to 1525 performed by the compute node 100, steps 1530 to 1535 are carried out by the storage node 120. When the storage node 120 receives E.D7, the storage control software 600 obtains data D11 by decrypting E.D7 using SecretStr (step 1530). The storage control software 600 then searches the TBL4 620 for an entry that includes GOSID, TID, VID, and the old token included in the data D11 (step 1531).

In the case where the applicable entry is not detected, the process is stopped. Where the applicable entry is detected and where the token is to be updated, the storage control software 600 generates data D12 by excluding the old token from the data D11, and calculates a hash value H.D12 of the data D12 (steps 1532 and 1533). The storage control software 600 then overwrites the entry detected as described above in the TBL4 with the new token and hash value H.D12 for registration (step 1534). In the case of the deletion, the storage control software 600 deletes the old token from the applicable entry. The storage control software 600 may alternatively delete GOSID, TID, VID, and the old token. Upon completion of the above steps, the storage control software 600 notifies the I/O path controller 130 thereof (step 1535).

When receiving a notification 1525 from the compute node 100 and a notification 1535 from the storage node 120, the I/O control setting software 500 of the I/O path controller 130 overwrites the old token in the entry selected in step 1510 with the new token generated in step 1511. In the case of the deletion, the I/O control setting software 500 may delete either the old token, or GOSID, TID, VID and the token.

Incidentally, although FIG. 1 indicates that the compute nodes, I/O path controller, and storage nodes are separate hardware entities interconnected over the network, this is not limitative of the present invention. Alternatively, these components may be configured in the same node by virtualizing such resources as CPUs, memories, and drives. For example, there may be the following configurations in addition to that of FIG. 1:

(1) The compute nodes and storage nodes are configured in the same node.

(2) The compute nodes and the storage control software of the storage nodes are configured in the same node, and storage node drives are configured in another node.

(3) The compute nodes are configured in one mode, the storage control software of the storage nodes is configured in another node, and storage node drives are configured in yet another node.

Figure 16:
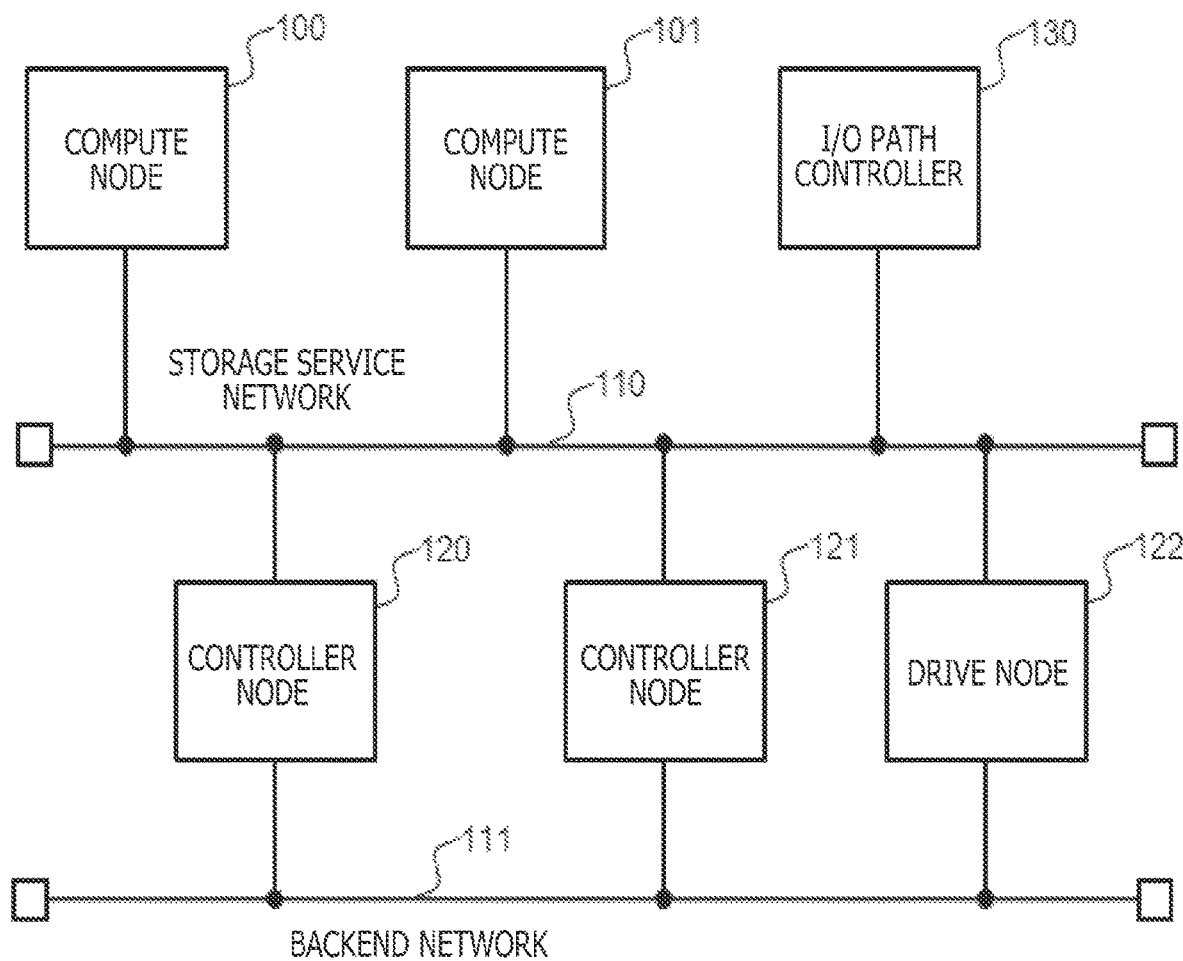
FIG. 16 is a block diagram depicting an overall configuration of an information processing system as another embodiment of the present invention.

(4) Each storage node is divided into a controller node having a controller and a drive node having a drive. Each compute node may be configured either as an independent node or in a manner integrated with the controller node. The configuration (4) is depicted in FIG. 16.

The I/O path controller may be configured either as an independent node or in a manner integrated with any other node.

The above-described processes are applicable to the configurations (1) to (3) above. The configuration (4) above involves some different steps that need explanation. In the configuration (4), at least one controller node and at least one drive node are set to be in charge of a given storage space. The compute node inputs and outputs data by accessing both the controller node and the drive node directly or indirectly. The compute node directly accesses the controller node and the drive node, or accesses both also indirectly by getting an access operation on one of the two nodes transferred to the other node.

In the configuration (4) above, the controller node and the drive node both have a storage node access control function. The I/O path controller transfers to both the controller node and the drive node the token and other data transmitted to the storage node. Upon receipt of the token and other data, the controller node and the drive node both make preparations for accepting an access operation from the compute node.

The compute node transmits a read or write request to one or both the controller node and the drive node along with a token and other data. Upon receipt of the request, the controller node and the drive node each determine the executability of the access and handle the request accordingly. The same applies to the case where a request from the compute node is transferred between the controller node and the drive node.

The above-described steps make it possible to update or delete the token and the hash value registered in the TBL1, TBL4, TBL2, and TBL3 managed by the compute node 100, storage node 120, and I/O path controller 130.

Thus the embodiments of the present invention constitute an information system in which, upon receipt of an I/O request, the storage node determines whether the request originates from a registered guest OS and thereby determines the executability of the I/O request.

The present invention applies extensively to information processing systems of diverse configurations that involve multiple compute nodes and storage nodes.

What is claimed is:

1. An information processing system comprising:
a plurality of storage parts configured to input and output data upon receipt of an I/O request from a compute part on which software operates; and
an I/O control part configured to control access to the storage parts from the compute part,
wherein the I/O control part receives from the compute part an authentication request including ID of the software and information regarding a storage area to and from which the software performs input and output,
wherein upon authentication of the compute part, the I/O control part transmits a token to the compute part to let the compute part access the storage parts, the I/O control part further transmitting the ID of the software, the information regarding a storage region to and from which the software performs input and output, and the token to the storage part corresponding to the information regarding the storage area,
wherein the corresponding storage part receives from the compute part the I/O request including the software ID, the information regarding the storage area to and from which the software performs input and output, and the token, the corresponding storage part further checking the I/O request against the software ID, the information regarding the storage area, and the token received from the I/O control part so as to determine whether access to the corresponding storage part is allowed,
wherein upon determination that the access to the corresponding storage part is allowed, the corresponding storage part processes the I/O request,
wherein the compute part includes the software, an access control information table, and an agent,
wherein the compute part includes, as the software, a hypervisor, a guest OS operating on the hypervisor, and an application operating on the guest OS,
wherein, when the application is operating, the agent transmits the authentication request and stores the token,
wherein, upon request by the application, the hypervisor transmits the I/O request,
wherein the access control information table stores information exchanged and used during the transmitting of the authentication request and the transmitting of the I/O request, and
wherein the access control information table includes information assigned to each compute node including information an operating of the hypervisor on each compute node, information identifying the guest OS built on the hypervisor, information identifying a storage space in which the guest OS performs I/O operations, a target ID, a volume ID, the token, and a hash value combining the information identifying the guest OS, information identifying the storage space, the target ID, the volume ID, and the token.

2. The information processing system according to claim 1, wherein the authentication request destined from the compute part to the I/O control part and the token destined from the I/O control part to the compute part are decryptably encrypted when transmitted, and
wherein the software ID and the information regarding the storage area included in the I/O request transmitted from the compute part to the storage parts are turned into the hash value when transmitted.

3. The information processing system according to claim 2, wherein
the storage part converts to a hash value the software ID and the information regarding the storage area received from the I/O control part and stores the hash value in association with the token, and
upon receipt of the I/O request, the storage part selects the stored token based on the hash value included in the I/O request so as to check the I/O request.

4. The information processing system according to claim 1, wherein
the agent, upon request by the software, transmits the authentication request and stores the received token, and
wherein the software, using the stored token, transmits the I/O request to the storage part.

5. The information processing system according to claim 4, wherein
the compute part has, as the software, a container platform and an application operating on the container platform,
when the application is operating, the agent transmits the authentication request and stores the token, and
upon request by the application, the container platform transmits the I/O request.

6. The information processing system according to claim 1, wherein
the storage part includes a first storage part and a second storage part interconnected with each other via a network, the first storage part and the second storage part collaborating to perform data input and output,
upon authentication of the compute part, the I/O control part transmits the ID of the software, the information regarding the storage region to and from which the software performs input and output, and the token to the first storage part and the second storage part,
the first storage part and the second storage part each receive either directly or indirectly the I/O request including the ID of the software, the information regarding the storage region to and from which the software performs input and output, and the token from the compute part, the first storage part and the second storage part further checking the I/O request against the software ID, the information regarding the storage area, and the token received from the I/O control part in order to determine whether access to the first and the second storage parts is allowed, and upon determination that the access to the first and the second storage parts is allowed, the first and the second storage parts process the I/O request.

7. The information processing system according to claim 1, wherein, upon meeting a predetermined condition, the I/O control part transmits a request to either update or delete the token to the compute part and to the storage part, and upon receipt of the request to either update or delete the token, the compute part and the storage part either update or delete the token.

8. An information processing method for use with an information processing system including a plurality of storage parts configured to input and output data upon receipt of an I/O request from a compute part on which software operates, and an I/O control part configured to control access to the storage parts from the compute part, the information processing method comprising:

by the I/O control part, receiving from the compute part an authentication request including ID of the software and information regarding a storage area to and from which the software performs input and output;

by the I/O control part, upon authentication of the compute part, transmitting a token to the compute part to let the compute part access the storage parts, transmitting the ID of the software, the information regarding a storage region to and from which the software performs input and output, and the token to the storage part corresponding to the information regarding the storage area;

by the corresponding storage part, receiving from the compute part the I/O request including the software ID, the information regarding the storage area to and from which the software performs input and output, and the token, checking the I/O request against the software ID, the information regarding the storage area, and the token received from the I/O control part so as to determine whether access to the corresponding storage part is allowed; and by the corresponding storage part, upon determination that the access to the corresponding storage part is allowed, processing the I/O request, wherein the compute part includes the software, an access control information table, and an agent, wherein the compute part includes, as the software, a hypervisor, a guest OS operating on the hypervisor, and an application operating on the guest OS, wherein, when the application is operating, the agent transmits the authentication request and stores the token, wherein, upon request by the application, the hypervisor transmits the I/O request, wherein the access control information table stores information exchanged and used during the transmitting of the authentication request and the transmitting of the I/O request, and wherein the access control information table includes information assigned to each compute node including information an operating of the hypervisor on each compute node, information identifying the guest OS built on the hypervisor, information identifying a storage space in which the guest OS performs I/O operations, a target ID, a volume ID, the token, and a hash value combining the information identifying the guest OS, information identifying the storage space, the target ID, the volume ID, and the token.

* * * * *